Dec. 16, 1958  O. A. KERSHNER ET AL  2,864,238
FLUID DISPLACEMENT DEVICE FOR HYDRAULIC BRAKE SYSTEMS
Filed May 9, 1955
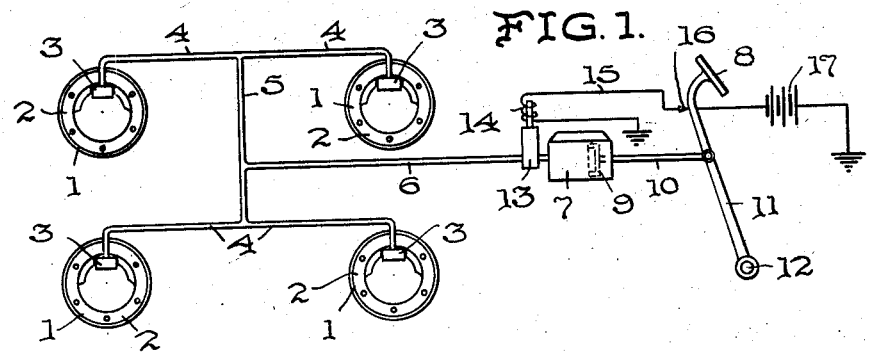
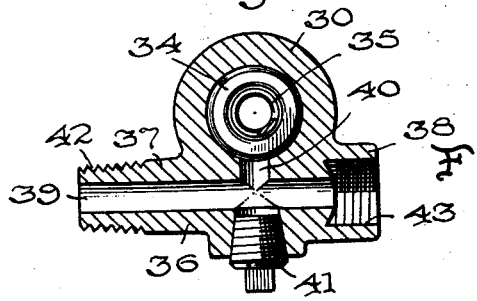
INVENTORS
O. A. Kershner
E. Hahn
BY
Robb & Robb
ATTORNEYS

United States Patent Office 2,864,238
Patented Dec. 16, 1958

1

2,864,238

FLUID DISPLACEMENT DEVICE FOR HYDRAULIC BRAKE SYSTEMS

Osborn A. Kershner and Emil Hahn, St. Joseph, Mich., assignors, by mesne assignments, to Lambert Brake Corporation, St. Joseph, Mich., a corporation of Michigan Application May 9, 1955, Serial No. 506,855

1 Claim. (Cl. 60—54.6)

The present invention relates to an improved and novel fluid displacement device for hydraulic brake and analogous systems, wherein fluid under pressure is supplied from a power cylinder or compressor to a fluid-operated motor. The displacement device of the invention is of value in such fluid systems generally, but has particular value in hydraulic brake systems to apply initial fluid pressure to the brake actuator cylinder or cylinders to take up slack or clearance in the brakes. This slack or clearance caused by manufacturing tolerances and/or the release clearance between the member to be braked and the brake discs, shoes, or other friction device, is present in all brakes.

The power or master cylinder utilized in such brake systems on motor vehicles usually includes a reciprocable piston which is operable by a pivotal foot-pedal-operated lever arm, the piston serving to force fluid from the cylinder through suitable lines to at least one wheel cylinder associated with the brake for each vehicle wheel. Because of the aforementioned slack or clearance, the preliminary portion of the movement of the master cylinder piston is utilized to take up the slack or clearance before any braking action can be applied by the brakes. This preliminary movement of the master cylinder piston increases as the brakes wear down, oftentimes to the point of allowing the foot pedal to abut with the vehicle floor board, thus preventing proper brake engagement, in cases where the brakes are badly worn and in need of adjustment or relining.

Therefore, an object of the present invention is to provide an improved fluid displacement device, preferably in the form of a unitary assembly, which can be readily installed in hydraulic brake systems and the like, and which is operable to inject a volume of hydraulic fluid into the brake lines to take up slack or clearance in the brakes, so as to reduce and minimize the movement required of the foot-pedal or other operator preliminary to braking action, this displacement device being extremely simple to manufacture and install in existing brake systems, without requiring modification of the conventional master cylinder or other regular elements of the systems, as well as in new systems.

Another object is to provide a fluid displacement unit which comprises a fitting adapted to be interposed between a brake master cylinder and the brake actuator cylinders of a motor vehicle, this fitting having a passageway extending therethrough for allowing unimpaired flow of fluid in the brake lines therethrough, said fitting having a reservoir of brake fluid and a passage establishing communication between the reservoir and the aforementioned passage, and a fluid displacement element shiftably mounted in the reservoir for movement in a direction to displace substantially all of the fluid from the reservoir into the passage and passageway in the fitting, said displacement element being adapted to pass over and block the entrance to the passage to prevent return of the fluid into the reservoir during braking action, and the displacement element being under the control of means for operating the brake master cylinder to displace the fluid as aforesaid prior to any fluid being forced through the fitting by said master cylinder.

Still another object is to provide a fluid displacement unit comprising a hollow casing having a central chamber extended therethrough, closures for the chamber at each end of the casing, an actuator member (preferably in the form of an armature of a solenoid) disposed in said chamber, a fluid displacement member (preferably in the form of a piston) also disposed in said chamber, resilient means in said chamber between the displacement member and one end closure to normally urge the actuator member and the fluid displacement member toward the other end closure so as to leave a fluid reservoir at one end of the casing, the casing having a port leading from this reservoir to a passage extending through a portion of the casing which is adapted to be interposed in the fluid line leading from a brake-operating master cylinder to one or more fluid-operated brake actuating motor cylinders, said displacement member being operative upon movement thereof in a fluid-displacing direction to inject substantially all of the fluid from the reservoir into the fluid line and to close off said port to prevent the fluid so injected from returning into the reservoir, so as to effect initial operation of the aforesaid motor cylinder or cylinders, said actuator member being operative to shift said displacement member as aforesaid prior to the operation of the master cylinder. Other objects and advantages of the invention will be hereinafter described or will become apparent to those skilled in the art, and the novel features thereof will be defined in the appended claims.

In the drawing:

Fig. 1 is a diagrammatic view, showing a conventional brake system of a wheeled vehicle, with our fluid displacement device incorporated in the system;

Fig. 2 is a view in elevation of the fluid displacement device;

Fig. 3 is a view in vertical section, as taken on the line 3—3 of Fig. 2; and

Fig. 4 is a view in horizontal section, as taken on the line 4—4 of Fig. 2.

Like reference characters in the several figures of the drawing and in the following description designate corresponding parts.

The system shown in Fig. 1 comprises a plurality of brakes 1 for the wheels of a motor vehicle, these brakes being of a conventional type and including disc means 2 adapted to be shifted into frictional engagement with a rotary member to be braked by means of a conventional hydraulic wheel or actuator cylinder 3. Leading to each of the wheel cylinders 3 is a feeder line 4 which is adapted to receive fluid from a line 5 which is in turn in communication with a main fluid supply line 6. This supply line 6 is adapted to carry brake actuating fluid from a conventional master cylinder 7 which is adapted to be operated by a conventional foot-operated pedal 8. The master cylinder 7 has reciprocably mounted therein a piston 9 which is connected by a rod 10 with an arm 11 which is pivotally mounted as at 12, so as to impart reciprocation to the piston 9 upon rocking of the arm 11 about the pivot 12.

The fluid displacement unit of the invention is generally designated 13 and may be interposed anywhere in line 6 which is convenient, but preferably, the displacement unit 13 is mounted adjacent to the master cylinder or is adapted to be connected at the outlet side of the master cylinder. As will hereinafter be more fully described, the fluid displacement unit is preferably operated by means of a solenoid 14, this solenoid being in an electrical circuit 15 including a suitable make-and-break switch 16 which is adapted to be operated by the arm 11 upon initial movement thereof, in a direction to operate the master cylinder, to close the circuit 15, current being supplied to the circuit from a battery 17.

Referring now to Figs. 2 through 4, the fluid displacement unit 13 preferably comprises a casing 18 formed of a primary casing section 19 and a secondary casing section 20, the casing sections 19 and 20 preferably being joined together at 21 by a pressed fit. A central chamber 22 extends through the housing 18 from end-to-end thereof, and the casing section 19 has an inside diameter of such a dimension as to allow for the installation of a solenoid coil 23 therein. Disposed in the central chamber 22 is a plunger or armature 24 of the solenoid. A conductor 25 extending through an axially extended opening 26 in the housing section 20 connects the solenoid coil 23 with a conventional electric terminal assembly 27, this terminal assembly being suitably secured to a closure member 28 which is disposed across one end of the casing 18 and secured to the secondary casing section 20 as by means of a suitable number of screws 29.

Threaded in the other end of the casing 18, as by means of a threaded engagement with the inner periphery of the free end of the primary casing section 19, is a fitting 30, this fitting 30 being locked relative to the casing 18 as by means of a pin 31 extending through the casing section 19 and into the threaded portion of the fitting. The fitting 30 is provided with a central piston chamber or reservoir 32, and the free end of the fitting 30 is provided with a closure plug 33 which is threaded into the open end of the fitting. Reciprocably disposed in the piston chamber or reservoir 32 is a fluid displacement plunger or piston 34, and a coiled compression spring 35 seating in central sockets 34' and 33' in the piston 34 and the closure plug 33, respectively, tends to resiliently bias the piston 34 into engagement with the solenoid armature 24, the sockets 33' and 34' housing the spring 35 as the piston 34 is moved towards the closure 33. The fitting 30 has a laterally offset portion 36 having an axially extended neck 37 at one side thereof and another axially extended neck 38 on the other side thereof. Extending through the portion 36 in alignment with the necks 37 and 38 is a passageway 39 which is in communication with the chamber 32 through a laterally extended passage or port 40. The portion 36 is also preferably provided with a drain plug 41 which is preferably located at the juncture of the port 40 with passageway 39.

The illustrated fluid displacement unit is preferably adapted to be connected at the outlet side of a brake master cylinder, and therefore, the neck 37 of the portion 36 of the fitting 30 is exteriorly screw threaded at 42 so as to threadedly engage in the outlet opening (not shown) of a conventional master cylinder. On the other hand, the neck 38 would accordingly be adapted for connection to a line such as the line 6 shown in Fig. 1, and therefore, this neck 38 is interiorly screw threaded at 43 for connection to a hydraulic line by means of a conventional connector device (not shown).

Assuming the displacement member 34 and the solenoid plunger or armature 24 to be in the positions shown in Fig. 3, the operation of the invention when installed in a brake system such as that shown in Fig. 1, is as follows:

When it is desired to apply the brakes 1, pressure will be applied to foot pedal 8 to rock arm 11 in a counterclockwise direction, whereupon switch 16 will instantly be closed to complete the circuit to the coil 23 of solenoid 14 from the battery 17. This will be accomplished before the rod 10 has shifted the piston 9 any appreciable distance, since the switch 16 is operated by a portion of arm 11 which is substantially farther from the pivot 12 than the connection of the rod 10 to the arm 11. Upon energization of the solenoid 14, the plunger or armature 24 will shift downwardly, as viewed in Fig. 3, and force the displacement member or piston 34 downwardly to force substantially all of the fluid in chamber 32 out through port 40 into passageway 39 and then into line 6, downward movement of the piston 34 being halted upon abutting contact thereof with the plug or closure 33, at a point where the side wall of the piston 34 will close off the port 40, thus preventing return of the fluid into the chamber 32 until such time as the solenoid is de-energized. For a given installation, the volume of the chamber 32 will be so proportioned as to inject just enough fluid into line 6 as will be required to supply fluid pressure through line 5 and lines 4 to each brake 1, to actuate the wheel cylinders 3 to such an extent as to take up any slack in the brakes and to take up the release clearance of the brakes, thus placing the brakes in condition for immediate frictional engagement with the rotary members to be braked upon additional pressure being supplied to the wheel cylinders 3. Accordingly, movement of the piston 9 in a direction to force fluid into line 6 will transmit such additional pressure to the wheel cylinders 3 so as to apply the brakes, but such movement of the piston 9 is not required to take up slack for release clearance in the brakes. Therefore, travel of the pedal 8 is maintained at an absolute minimum.

Upon release of the brakes, the arm 11 will swing back in a clockwise direction and the circuit to the solenoid 14 will be broken, whereupon spring 35 between piston 34 and closure 33 will urge the piston 34 and the solenoid armature 24 upwardly, as viewed in Fig. 3, the piston 34 moving away from port 40 so as to allow the chamber 32 to refill with fluid flowing back to the master cylinder 7 from the wheel cylinders 3.

While the specific details of the invention have been herein shown and described, changes and alterations may be resorted to without departing from the spirit thereof as defined in the appended claim.

We claim:

A fluid displacement device for use in fluid actuator systems having a fluid pressure-supplying cylinder and a fluid-pressure-operated motor cylinder, comprising a unitary fitting, a casing removably carried by said fitting, said fitting having a fluid-receiving plunger chamber therein, a plunger reciprocably mounted in said plunger chamber, said fitting also having a port leading from said plunger chamber to supply fluid from the plunger chamber to the motor cylinder, and a removable closure for one end of said plunger chamber, said port being adjacent to said closure, and said plunger and closure having abutting portions for limiting movement of said plunger towards said closure to a position where said port is closed by said plunger, resilient means interposed between said plunger and said closure to urge the plunger away from said closure, a solenoid coil in said casing, and a solenoid armature in said casing on the other side of said plunger from said resilient means for shifting said plunger towards said closure responsive to energization of said coil, thereby causing displacement of a predetermined volume of fluid from said chamber.

References Cited in the file of this patent

UNITED STATES PATENTS

| | | |
|---|---|---|
| 1,886,936 | Bowen | Nov. 8, 1932 |
| 1,899,009 | Bradbury | Feb. 28, 1933 |
| 2,058,063 | Cox | Oct. 20, 1936 |
| 2,069,578 | Eaton | Feb. 2, 1937 |
| 2,604,757 | Wulleman | July 29, 1952 |